No. 755,178. PATENTED MAR. 22, 1904.
G. W. SIMMONS.
PLOW.
APPLICATION FILED NOV. 30, 1903.
NO MODEL.
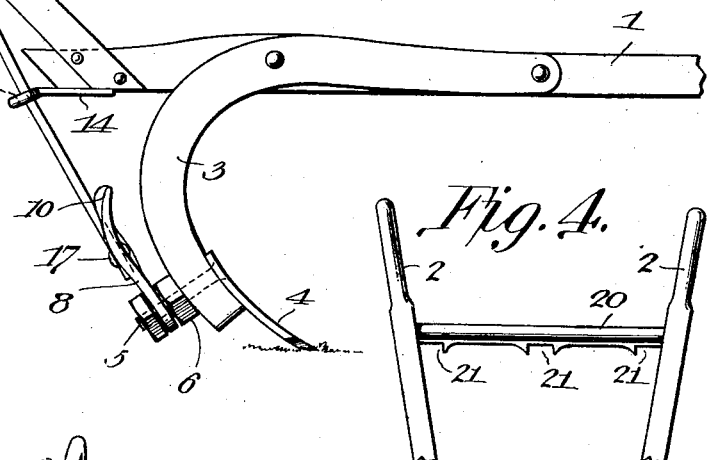
Fig. 1.
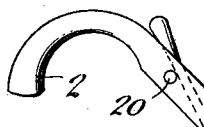
Fig. 6.
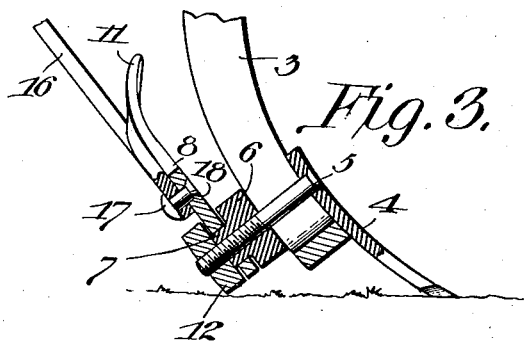
Fig. 4.
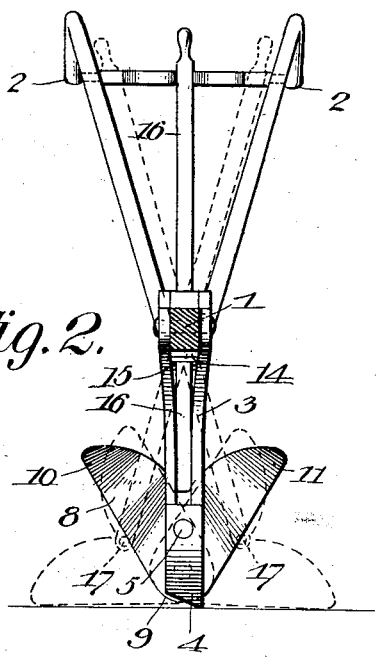
Fig. 2.
Fig. 3.
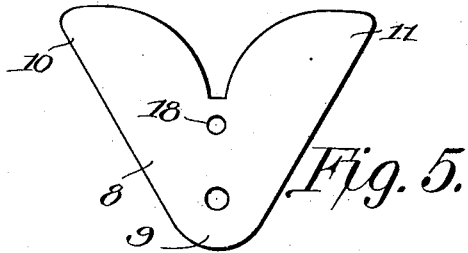
Fig. 5.
Witnesses
E. K. Stewart
Wm. Ragger
George W. Simmons,
Inventor.
by C. A. Snow & Co.
Attorneys No. 755,178. Patented March 22, 1904.

UNITED STATES PATENT OFFICE.

GEORGE W. SIMMONS, OF YELLOW RIVER, GEORGIA.

PLOW.

SPECIFICATION forming part of Letters Patent No. 755,178, dated March 22, 1904.

Application filed November 30, 1903. Serial No. 183,172. (No model.)

*To all whom it may concern:*

Be it known that I, GEORGE W. SIMMONS, a citizen of the United States, residing at Yellow River, in the county of Gwinnett and State of Georgia, have invented a new and useful Plow, of which the following is a specification.

This invention relates to plows; and it has for its object to provide a plow of ordinary construction with a pivotally-mounted moldboard or scraper mounted in rear of the standard upon the heel-bolt, by means of which the plow-point is secured to said standard, means being provided whereby the said adjustable scraper and moldboard may be adjusted to and sustained in various positions for operation.

With these and other ends in view the invention consists in the improved construction, arrangement, and combination of parts having for their object to provide a device of the class described which shall possess superior advantages in point of simplicity, durability, and general efficiency, as will be hereinafter fully described, and particularly pointed out in the claims.

In the accompanying drawings is illustrated a simple and preferred form of embodiment of my invention, it being understood that changes may be made as to proportion, size, and manner of assemblage without departing from my invention.

In said drawings, Figure 1 is a side elevation of a plow constructed in accordance with the principles of my invention. Fig. 2 is a front elevation with dotted lines showing various adjustments of the scraper and moldboard. Fig. 3 is a longitudinal vertical sectional view. Fig. 4 is a detail plan view showing the means for retaining the adjusting-lever at the desired adjustment. Fig. 5 is a detail plan view of the adjustable moldboard or scraper-blade. Fig. 6 is a perspective detail view of one of the nuts upon the latter.

Corresponding parts in the several figures are indicated by similar numerals of reference.

1 designates an ordinary plow-beam having handles 2 2 and carrying a bifurcated standard 3 of ordinary construction.

4 designates the ordinary point or blade secured upon the lower end of the standard by means of the heel-bolt 5, which extends between the side members of said standard.

6 is a nut which is screwed upon said heel-bolt tightly in engagement with the rear side of the standard, so as to retain the blade 4 securely upon the latter.

The nut 6, which is shown in detail in Fig. 6 of the drawings, is provided on its rear side with a circular boss or offset 7, upon which the moldboard or scraper 8 is pivotally mounted, said moldboard consisting of a blunt or rounded point 9, having right and left hand wings 10 and 11. This moldboard is secured upon the boss 7 by means of a nut 12, the latter being tightened up against the said boss without interfering with the free pivotal movement of the moldboard.

To the under side of the plow-beam 1 is secured a rearwardly-extending bracket 14, having a slot 15, through which extends an operating rod or lever 16, provided near its lower end with a pin 17, which engages an opening 18 in the moldboard, said opening 18 being disposed above and in vertical alinement with the opening 19, whereby said moldboard is fitted upon the boss 7. The bracket 14 constitutes the fulcrum for the operating-lever 16, the upper end of which normally rests against the rear side of a rung 20, connecting the plow handles near their upper ends. The operating-lever 16 is possessed of a degree of resiliency whereby it is held normally in contact with the rear side of the rung 20 and upon the rear side of the latter are disposed catches 21, which will engage and retain the lever 16 in position, either in a central vertical position or at the extremities of its movement toward the left or the right.

From the foregoing description, taken in connection with the drawings hereto annexed, the advantages and operation of my invention will be readily understood. When the operating-lever 16 occupies a straight vertical position, the moldboard or scraper will be held with its point downward. By swinging the operating-lever to the left the moldboard will be operated to the right, and the right-hand wing 10 will thus engage the soil. By reversing the position of the lever until it is at the extremity of its movement to the right the moldboard will swing to the left and the left-hand wing will engage the ground. This improved construction renders my improved plow very desirable and useful not only for hillside-work, but for various other purposes, which will be readily understood. The blade 4 may be a bull-tongue, or it may be in the nature of a scooter, or it may be of any suitable or desired kind, conformation, or size. I would likewise have it distinctly understood that the auxiliary pivoted blade 8 may be varied as to the size and shape thereof without departing from my invention. Thus when desired the said blade may be utilized as a subsoiler by adjusting it in what may be termed its "central" position, which has been illustrated in full lines in Fig. 2 of the drawings. It is evident, however, that in order to be utilized as a subsoiler a blade having a longer point than that shown in said Fig. 2 would have to be used.

Having thus described my invention, I claim—

1. In a plow, a standard, a blade supported upon the front side of said standard, a heel-bolt extending through said blade and standard, a nut upon said heel-bolt, screwed tightly against the rear side of the standard and having a boss upon its rear side, and an auxiliary blade mounted pivotally upon said boss.

2. In a plow, a standard, a blade upon the front side of said standard, a connecting-bolt, nuts upon the latter, one of said nuts being provided with a boss upon its rear side, and an auxiliary blade mounted pivotally upon said boss between the nuts.

3. In a plow, a standard, a blade upon the front side of the latter, a connecting-bolt, an auxiliary blade mounted pivotally with relation to the axis of said bolt, and means for adjusting and retaining said auxiliary blade.

4. In a plow, a standard, a blade upon the front side of said standard, a connecting-bolt extended rearwardly of said standard, a blade having right and left hand wings mounted pivotally with relation to the axis of said bolt, nuts upon said bolt, one of said nuts being provided with a boss supporting the pivoted blade which is confined between said nuts, a slotted bracket extending rearwardly from the plow-beam, an operating-lever fulcrumed in said slot and having pivotal engagement with the winged blade, and means for retaining said operating-lever in various positions to which it may be adjusted.

5. A plow having a beam, handles, a rung connecting the latter, and a standard, a blade supported upon the front side of said standard, a heel-bolt extending through the latter, a blade having right and left hand wings mounted pivotally with relation to the axis of said heel-bolt, means for retaining said blade upon said heel-bolt, and a slotted bracket extending rearwardly from the plow-beam, a resilient operating-lever having pivotal connection at its lower end with the winged blade, and bearing at its upper end against the rung connecting the plow-handles, and catches upon said rung engaging said operating-lever to retain the latter in adjusted position.

In testimony that I claim the foregoing as my own I have hereto affixed my signature in the presence of two witnesses.

GEORGE W. SIMMONS.

Witnesses:
WILLIAM T. TANNER,
GEORGE W. CLOWER.